No. 725,428. PATENTED APR. 14, 1903.
T. J. EVANS.
FISHING TACKLE.
APPLICATION FILED DEC. 6, 1902.
NO MODEL.

Witnesses
L. R. Lewis
Miles D. Osgood

Inventor
Thomas J. Evans
by John Elias Jones
Attorney

UNITED STATES PATENT OFFICE.

THOMAS J. EVANS, OF NEWPORT, KENTUCKY, ASSIGNOR OF THREE-FOURTHS TO MILES D. OSGOOD, OF CINCINNATI, OHIO.

FISHING-TACKLE.

SPECIFICATION forming part of Letters Patent No. 725,428, dated April 14, 1903.

Application filed December 6, 1902. Serial No. 134,107. (No model.)

*To all whom it may concern:*

Be it known that I, THOMAS J. EVANS, a citizen of the United States of America, and a resident of Newport, in the county of Campbell and State of Kentucky, have invented certain new and useful Improvements in Fishing-Tackle, of which the following is a specification.

This invention relates to certain improvements in fishing-tackle, and has for its object to provide an automatic fish-catching sinker adapted for use in connection with either pole or hand lines and of a simple and inexpensive structure adapted to act automatically to hook the fish in case of a bite and also adapted to be more readily disengaged from stones, snags, and the like, so that breaking of the line and loss of the hook and sinker in such cases are often avoided.

The invention consists in certain novel features of the construction, combination, and arrangement of the several parts of the improved automatic fish-catching sinker, whereby certain important advantages are attained and the device is made simpler, cheaper, and otherwise better adapted and more convenient for use than various other similar devices heretofore employed, all as will be hereinafter fully set forth.

The novel features of the invention will be carefully defined in the claims.

Figure 1:
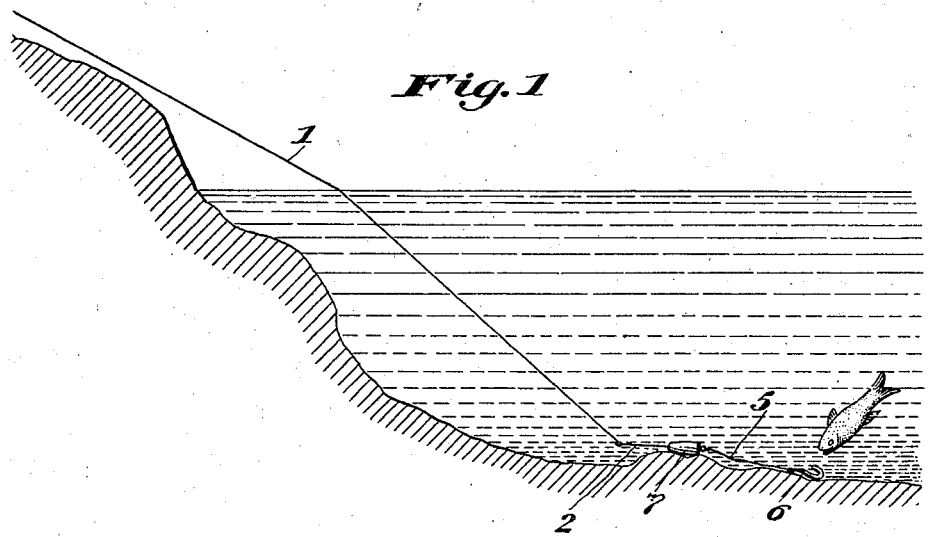
Figure 2:
Figure 3:
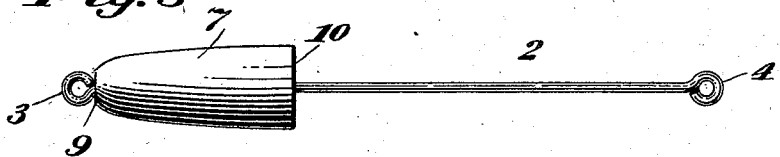
Figure 4:
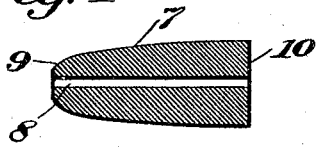

In the accompanying drawings, which serve to illustrate my improvements, Figure 1 is a somewhat diagraphic view showing the improved sinker as it appears when in use on a fish-line. Fig. 2 is an enlarged view showing the improved sinker in side elevation, the parts being in the position in which they stand before a fish has bitten; and Fig. 3 is a view similar to Fig. 2, but showing the parts in the position in which they stand after a fish has bitten. Fig. 4 is a section taken lengthwise through the sliding weight of the sinker detached.

As seen in the views, 1 indicates the fish-line, which may be either a hand-line or may be held to a pole in the ordinary way, and 2 indicates a shank or stem for the sinker, the said stem or shank being formed of an elongated straight piece or length of metal wire or strip having opposite ends bent to produce loops or eyes 3 and 4, the loop or eye 3 at one end serving for connection of the sinker with the lower end of the fish-line 1, and the loop or eye 4 at the other end of the stem or shank serving for the attachment of a short length or section 5 of line or catgut, on which is carried the hook 6.

7 indicates the sliding weight portion of the improved fish-catching sinker, which may be constructed from lead or other heavy material in elongated rounded form, with a bore or passage 8 extended in it through which the stem or shank 2 of the device is passed, there being sufficient looseness to permit the weight portion to slide freely upon the stem or shank in the operation of the device.

The weight portion 7 will be applied to the shank or stem 2, preferably before one of the loops or eyes 3 and 4 has been produced in the metal wire or strip of which said shank is formed, the said loops or eyes serving in the completed device to hold the weight securely in place upon the shank, as will be readily understood.

The weight portion 7 of the improved sinker is made tapered or rounded toward that end of the shank or stem at which the fish-line 1 is attached, and the opposite larger end of said weight portion is formed with an abrupt shoulder, and by this construction it will be seen that when the line is being drawn in by the fisherman the smaller rounded end 9 of the weight portion will slip and ride freely over stones, snags, and other obstructions, while when the fish has bitten at the hook, causing draft on the line and shank or stem in a direction away from the fisherman, the abrupt shoulder 10 at the opposite larger end of the weight portion 7 will bind upon the ground or upon any stones which may be in the path of the device, so as to resist the effort of the fish to draw out the line and also to cause the hook 6 to strike into the mouth of the fish to securely hold him to the fish-line.

The straight central portion of the shank or stem 2 of the improved sinker is of considerably greater length than the weight portion 7 of the sinker, so that when the fish bites and draws upon the line the said straight portion of the stem or shank 2 will move through the weight portion 7 freely and permit the fish to draw sharply upon the line before the loop or eye 3 comes in engagement with the smaller end 9 of the weight portion and stops further movement of the stem or shank therethrough.

In the use of the improved sinker when the fish has bitten and has drawn upon the line, as above described, the contact of the loop or eye 3 with the smaller end 9 of the weight portion 7 will offer a sharp and sudden resistance to further movement of the fish, so that the baited hook 6 will be caused to strike or sink deeply into the fish's mouth, whereby he will be securely held on the line; also, owing to the fact that the shank or stem is movable freely through the weight portion the fish, when nibbling at the baited hook, are given confidence that the bait is free and loose and will more readily seize the bait than where the bait is held by the sinker against such free movement.

When the fish-line provided with my improved sinker has been cast and drawn taut, the outer loop or eye 4 on the shank or stem 2 will be in contact with the larger outer end of the weight portion 7, and by simply drawing upon the line from time to time the fisherman may readily tell whether his bait is right or not, since should a fish nibble at the bait he would tend to draw the stem or shank 2 endwise through the weight portion and the draft upon the line would bring the outer loop or eye 4 up into contact with the sinker with a shock which could be readily felt by the fisherman.

When the line is being drawn in should the larger weight portion 7 of the sinker catch upon or under a rock or snag it is evident that the projecting forward end of the stem or shank 2 will act as a lever to assist in dislodging said weight portion, so that the liability to loss of the sinker and hook in cases of this kind is considerably lessened.

From the above description of my invention it will be seen that the improved sinker constructed in accordance therewith is of an extremely simple and inexpensive nature and is especially well adapted for use, since it not only dispenses with great care and skill on the part of the fisherman by automatically hooking the fish when the bait has been seized and drawn upon by the fish, but also affords material assistance in disengaging the line from rocks and other obstructions, and it will also be obvious from the above description that the device is capable of some modification without material departure from the principles and spirit of the invention, and for this reason I do not wish to be understood as limiting myself to the precise form and arrangement of the several parts of the device as herein set forth.

Having thus described my invention, I claim—

1. In fishing-tackle, a sinker comprising a stem or shank formed from a strip or piece of metal in elongated form and provided at its ends with enlargements and a weight portion loosely held for sliding movement along the length of said stem or shank between said enlargements, substantially as set forth.

2. In fishing-tackle, a sinker comprising a stem or shank formed from a strip or piece of metal in elongated form and provided at its ends with closed loops or eyes adapted for connection with a fish-line and with a hook-carrying-line section, and a weight portion loosely held for sliding movement along the length of said stem or shank between said eyes or loops, substantially as set forth.

3. In fishing-tackle, a sinker comprising a stem or shank formed from a strip or piece of metal in elongated form and provided at its ends with enlargements and a weight portion loosely held for sliding movement along the length of said stem or shank and having one end tapered or rounded, substantially as set forth.

4. In fishing-tackle, a sinker comprising a stem or shank formed from a strip or piece of metal in elongated form and provided at its ends with enlargements and a weight portion loosely held for sliding movement along the length of said stem or shank and having one end tapered or rounded and adapted for contact with the enlargement at one end of the strip and its other end provided with a shoulder adapted for engagement with the enlargement at the other end of the shank, substantially as set forth.

Signed at Cincinnati, Ohio, this 26th day of November, 1902.

THOMAS J. EVANS.

Witnesses:
MILES D. OSGOOD,
JOHN ELIAS JONES.